(12) United States Patent
Gordon et al.

(10) Patent No.: US 7,137,009 B1
(45) Date of Patent: Nov. 14, 2006

(54) METHOD AND APPARATUS FOR SECURING A COOKIE CACHE IN A DATA PROCESSING SYSTEM

(75) Inventors: Sharon M. Gordon, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 09/478,309

(22) Filed: Jan. 6, 2000

(51) Int. Cl.
*H04L 9/00* (2006.01)
(52) U.S. Cl. .................... 713/185; 726/8; 726/9
(58) Field of Classification Search ............ 713/165, 713/202, 185; 726/8–9
See application file for complete search history.

(56) References Cited

U.S. PATENT DOCUMENTS

| | | | |
|---|---|---|---|
| 6,029,141 A * | 2/2000 | Bezos et al. ............... 705/27 |
| 6,205,480 B1 * | 3/2001 | Broadhurst et al. ......... 709/225 |
| 6,324,648 B1 * | 11/2001 | Grantges, Jr. ............. 713/201 |
| 6,339,423 B1 * | 1/2002 | Sampson et al. ........... 345/854 |
| 6,510,464 B1 * | 1/2003 | Grantges et al. ........... 713/201 |

* cited by examiner

*Primary Examiner*—Kim Vu
*Assistant Examiner*—Paula Klimach
(74) *Attorney, Agent, or Firm*—Duke W. Yee; Mark S. Walker; Francis Lammes

(57) ABSTRACT

A method and apparatus in a data processing system for providing access to resources within the data processing system. A request is received from a requestor to access a resource in the data processing system. A cookie is sent to the requestor, wherein the cookie is used to access the resource. An identification of the requestor and the cookie is stored to form a stored identification and a stored cookie. Responsive to receiving a subsequent cookie from a source, an identification of the source and the cookie is compared with the stored identification and the stored cookie. Responsive to a match between the identification of the source and the cookie and the stored identification and the stored cookie, access to the resource is allowed.

23 Claims, 3 Drawing Sheets

| | | | |
|---|---|---|---|
| 402 — 27.146.16.8 | COOKIE 1 | COOKIE 2 | COOKIE 3 |
| 404 — 27.145.3.54 | COOKIE 1 | | |
| 406 — 140.12.34.8 | COOKIE 1 | COOKIE 2 | |
400
*FIG. 4*
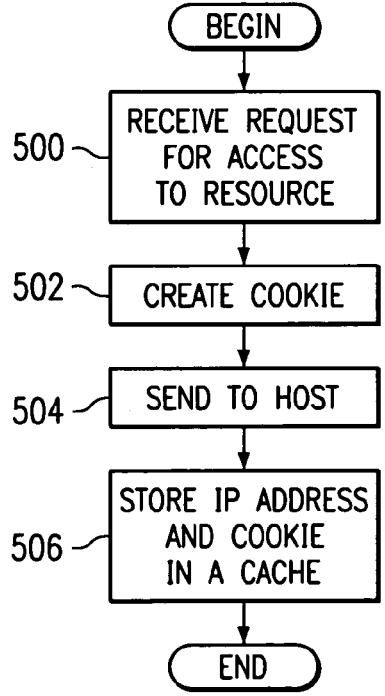
*FIG. 5*
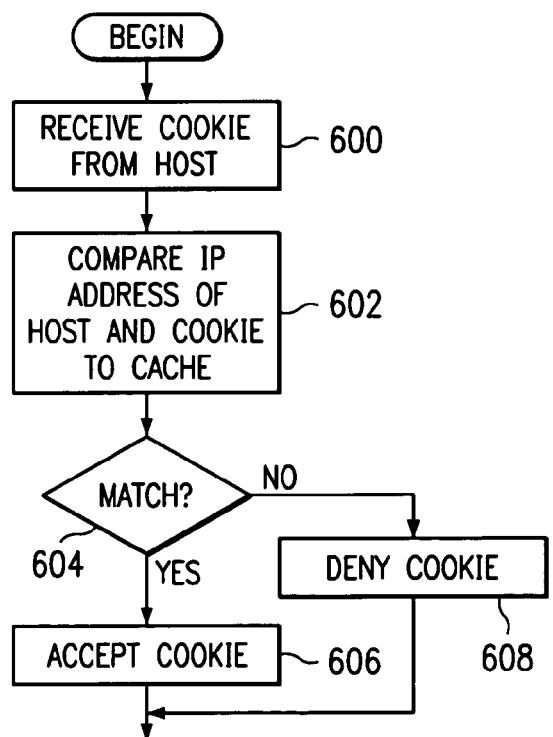
*FIG. 6*

METHOD AND APPARATUS FOR SECURING A COOKIE CACHE IN A DATA PROCESSING SYSTEM

BACKGROUND OF THE INVENTION

1. Technical Field

The present invention relates generally to an improved data processing system and in particular to a method and apparatus for securing data in a data processing system. Still more particularly, the present invention provides a method and apparatus for securing cookies in a data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.).

The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and businesses use the Web to purchase various goods and services.

In browsing the Web, a user at a Web browser may see a question or warning as to whether a cookie should be accepted. A cookie is opaque data representing a resource on a client. An example of a cookie is the disk location of a file on a client machine. It may be necessary for a remote host, such as a Web server, to write a file or access some other resource on the client machine. The cookie provides a convenient mechanism for a host or server to access information on a client machine. In some cases, a host or server may be a malicious one in that the cookie is altered by the host such that the remote host is able to access information or files that have not been authorized by the user.

Therefore, it would be advantageous to have an improved method and apparatus for securing cookies in a data processing system to prevent unauthorized access of resources on a data processing system by a remote host or server.

SUMMARY OF THE INVENTION

The present invention provides a method and apparatus in a data processing system for providing access to resources within the data processing system. A request is received from a requester to access a resource in the data processing system. A cookie is sent to the requester, wherein the cookie is used to access the resource. An identification of the requestor and the cookie is stored to form a stored identification and a stored cookie. Responsive to receiving a subsequent cookie from a source, an identification of the source and the cookie is compared with the stored identification and the stored cookie. Responsive to a match between the identification of the source and the cookie and the stored identification and the stored cookie, access to the resource is allowed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram of a cookie cache depicted in accordance with a preferred embodiment of the present invention;

FIG. 5 is a flowchart of a process for generating cookies depicted in accordance with a preferred embodiment of the present invention; and FIG. 6, is a flowchart of a process for managing the receipt of cookies depicted in accordance with a preferred embodiment of the present invention.

DETAILED DESCRIPTION OF THE PREFERRED EMBODIMENT

Figure 1:
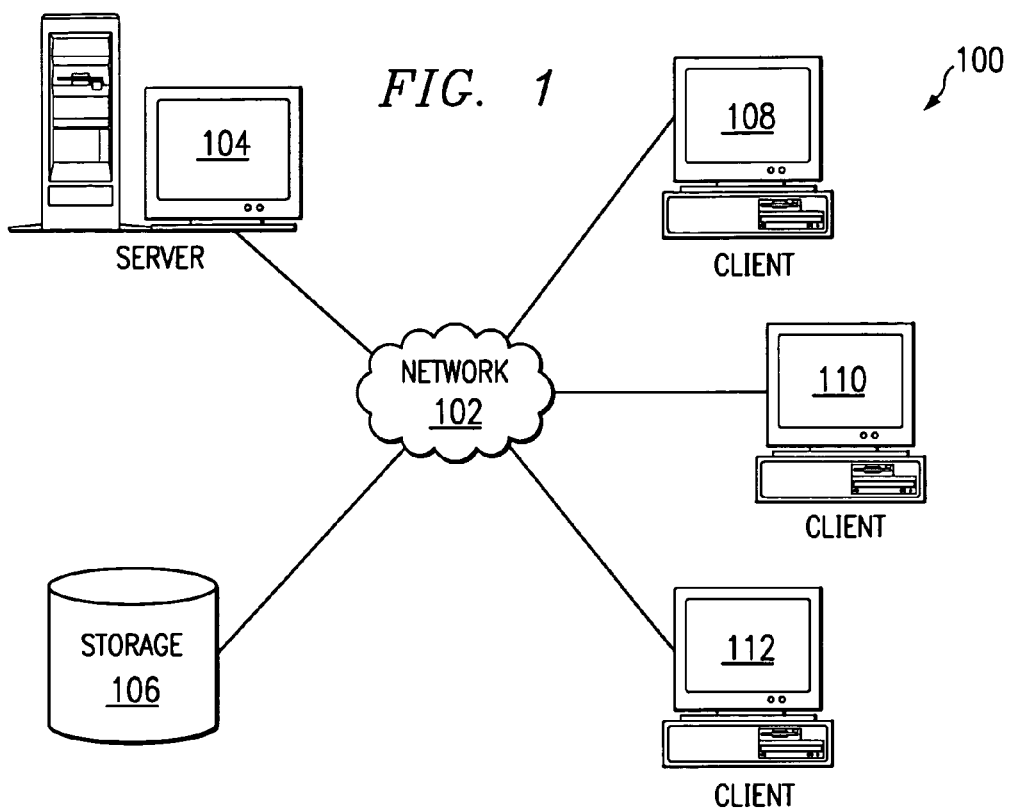
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
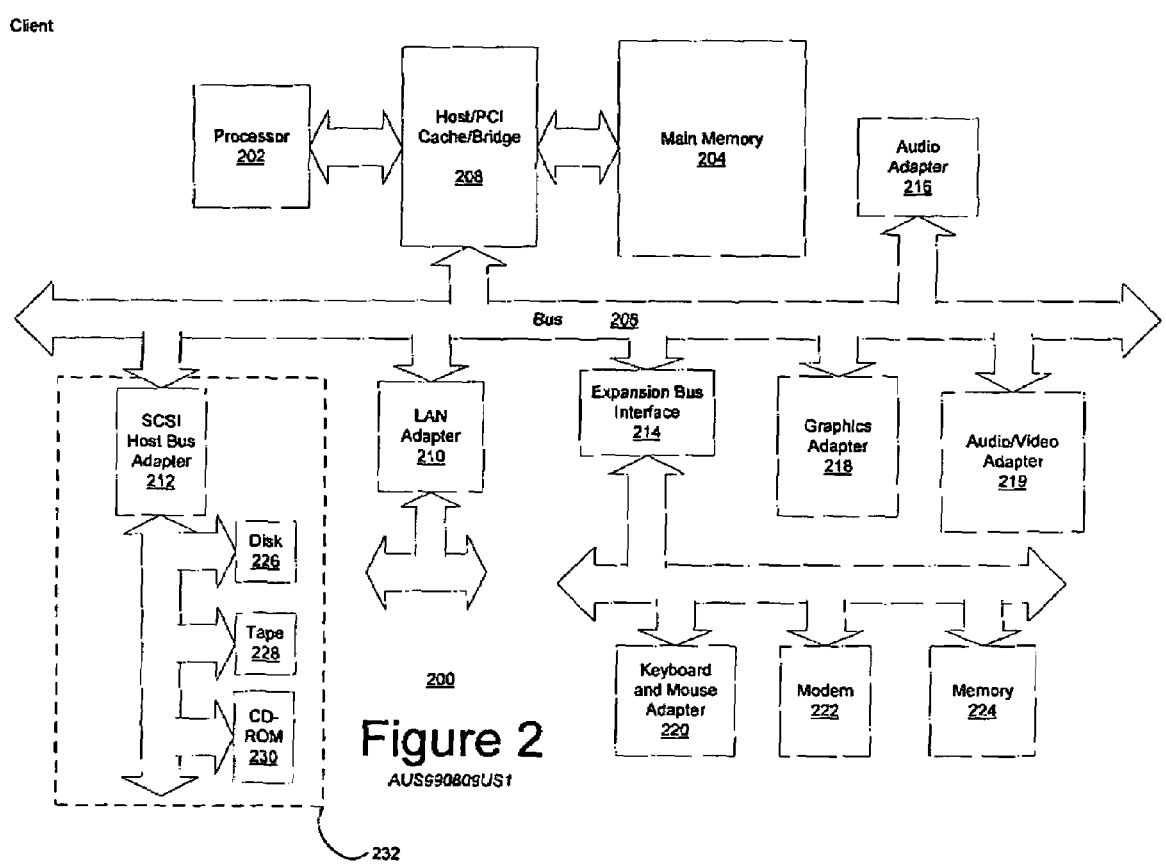
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides an improved method, apparatus, and computer implemented instructions for securing cookies in a data processing system. In particular, the present invention provides a mechanism for a secure cookie cache. Before issuing a cookie to a remote host, the cookie is cached with an IP address associated with the remote host. Of course some other identifier may be used other than an IP address to identify the remote host. When the remote host offers a cookie to the client, a determination is made as to whether a match is present between the cached cookie and the cookie offered by the remote host. If a match between both the cookie and the IP address is present, the cookie is accepted and the remote host is allowed to access the particular resource, such as a file on a disk. If a match is not present, the cookie is rejected and rights or access to resources on the client machine are prevented. Additionally, the secure cookie cache of the present invention also may prevent the use of a cookie by any other system other than the intended remote host. For example, if a cookie is intercepted by network "ease dropper" system it would be invalid for any system accept for the specific remote host to which the cookie was issued. Thus, the cookie matches, but the IP address does not match, the cookie is not accepted in these examples.

Figure 3:
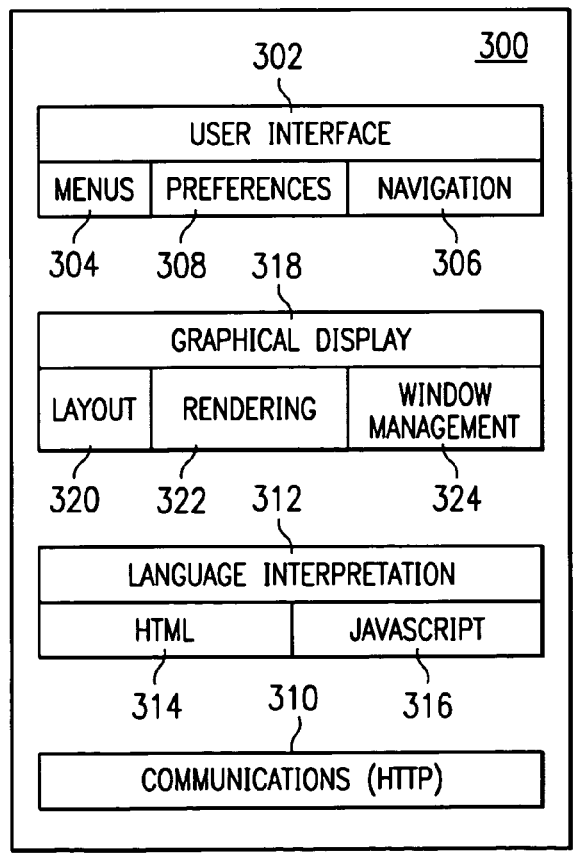
FIG. 3 is a block diagram of a browser program depicted in accordance with a preferred embodiment of the present invention.

Turning next to FIG. 3, a block diagram of a browser program is depicted in accordance with a preferred embodiment of the present invention. A browser is an application used to navigate or view information or data in a distributed database, such as the Internet or the World Wide Web. Browser 300 is an example of an application on a data processing system that may implement processes to manage the acceptance of a cookie from a remote host or server.

In this example, browser 300 includes a user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses HTTP. Other protocols may be used depending on the implementation. In this example, communications 310 may implement the processes used to generate, send, and receive a cookie. Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

With reference now to FIG. 4, a diagram of a cookie cache is depicted in accordance with a preferred embodiment of the present invention. In this example, cookie cache 400 contains three entries for three different hosts. Each of these hosts is identified by an IP address. In entry 402, the IP address for the host is 27.146.16.8. In entry 404, the host is identified by the IP address 27.145.3.54, and in entry 406, the host is identified by the IP address 140.12.34.8. Multiple cookies may be accepted from a different host as can be seen in FIG. 4. In this example, entry 402 contains three cookies, entry 404 contains one cookie, and entry 406 contains two cookies. Of course, any number of cookies for a particular host may be stored in cookie cache 400. When a cookie is presented to the client machine for acceptance, the process of the present invention in a Web browser are used to compare that cookie to the cookies in cookie cache 400. The comparison is made by comparing both the cookie and the IP address. A match between both the IP address and the cookie must be present in order for the cookie to be accepted in this example. Otherwise acceptance of the cookie is denied.

With reference now to FIG. 5, a flowchart of a process for generating cookies is depicted in accordance with a preferred embodiment of the present invention. In this example, a request is received from a host for access to a resource on the client machine (step 500). In this example, the cookie may be a disk location of a file on the client machine. It may be necessary for the host to write to a file on the client. In this example, the host may request to write to a file having path name such as: c:\temp\birds\robin.gif. A cookie is then generated (step 502). The client machine converts the ASCII string of the file path name into a number representing the disk location of the file. This disk location number is placed into a cookie. This cookie is then sent to the host (step 504). The cookie is used by the remote machine when referencing the particular file. For example, instead of writing data explicitly using the path name "c:\temp\birds\robin.gif", the number is used. This allows the client machine to avoid having to convert the string for the path name into the disk location for every write to the file. The IP address and the cookie are stored in a cookie cache (step 506) with the process terminating thereafter. This cookie cache is, for example, cookie cache 400 in FIG. 4.

With reference now to FIG. 6, a flowchart of a process for managing the receipt of cookies is depicted in accordance with a preferred embodiment of the present invention. The process begins by receiving a cookie from a host (step 600). This cookie and the IP address of the host are compared to the cookie and IP addresses in the cookie cache (step 602). A determination is made as to whether a match is present between the IP address of the host and the cookie received as well as the IP address and a cookie within a cookie cache (step 604). If a match is present, the cookie is accepted (step 606) with the process terminating thereafter. Otherwise, the cookie is denied (step 608) with the process also terminating thereafter.

Thus, the present invention provides a secure mechanism for managing the acceptance of cookies at a client machine. This mechanism prevents a malicious host from altering the cookie to allow access to other resources other than those authorized by the client. For example, the mechanism of the present invention prevents a host from altering a cookie for the path c:\temp\birds\robin.gif to c:\autoexec.bat. This is prevented because the mechanism of the present invention stores the IP address of the host as well as the cookie itself in a cookie cache. When a cookie is sent back to the client for acceptance, a comparison of the IP address of the host presenting the cookie as well as the cookie itself are compared. If the cookie has been altered, a match will not be present. In that instance, the cookie is rejected. Further, the present invention also provides an advantage that eave droppers are unable to access the client system through the use of an intercepted cookie. Even if a cookie is intercepted, it would be invalid for any system but the specific remote host to which the cookie was issued.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the identifier used to identify a server was illustrated in the form of an IP address, other types of identifiers could be used. For example, the URL for a server may be used as the identifier. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for providing access to resources within the data processing system, the method comprising the data processing system implemented steps of:

receiving a request from a requestor to access a resource in the data processing system;

sending a first cookie to the requestor in response to the request, wherein the cookie is used to access the resource;

storing an identification of the requester and the first cookie to form a stored identification and a stored cookie, wherein the identification of the requestor identifies a particular data processing system from which the request originated;

responsive to receiving a second cookie from a source, comparing an identification of the source and the second cookie with the stored identification and the stored cookie to determine whether the second cookie contains the same information as the first cookie and whether the second cookie was received from the particular data processing system; and responsive to a match between the identification of the source and the second cookie and the stored identification and the stored cookie, allowing access to the resource.

2. The method of claim 1, wherein access to the resource is allowed by accepting the second cookie.

3. The method of claim 1 further comprising:

responsive to an absence of a match between the identification of the source and the second cookie and the stored identification and the stored cookie, rejecting the second cookie.

4. The method of claim 1, wherein the resource is a file and the first cookie identifies disk location of the file.

5. The method of claim 1, wherein the source is a web server.

6. The method of claim 1, wherein the step of storing an identification of the source and the first cookie to form a stored identification and a stored cookie comprises:

storing the identification of the source and the first cookie in a cache.

7. The method of claim 6, wherein the identification is an Internet protocol address.

8. The method of claim 1, wherein the steps of receiving, sending, storing, comparing, and allowing are performed in a browser.

9. The method of claim 1, wherein the resource is a file having a path and further comprising:

generating a disk location number from the path; and placing the disk location number into the first cookie.

10. A data processing system comprising:

a cache;

a cookie management process, wherein the cookie management process generates a cookie in response to receiving a request to access a resource within the data processing system from a requestor; sends the cookie to the requester, stores the cookie and an identification of the requestor in the cache wherein the identification of the requestor identifies a particular data processing system from which the request originated; responsive to being presented a received cookie from a source, compares the cookie and the identification of the requestor to the received cookie and the source to determine whether the received cookie contains the same information as the cookie sent to the requestor and whether the received cookie was received from the particular data processing system; and allows access to the resource in response to a match between the cookie and the identification of the requester with the received cookie and the source.

11. The data processing system of claim 10, wherein the requester is a server.

12. The data processing system of claim 10, wherein the resource is a file.

13. The data processing system of claim 10, wherein the identification of the requestor and the identification of the source are Internet protocol addresses.

14. A data processing system for providing access to resources within the data processing system, the data processing system comprising:

receiving means for receiving a request from a requestor to access a resource in the data processing system;

sending means for sending a first cookie to the requestor, wherein the first cookie is used to access the resource;

storing means for storing an identification of the requestor and the first cookie to form a stored identification and a stored cookie, wherein the identification of the requestor identifies a particular data processing system from which the request originated;

comparing means, responsive to receiving a second cookie from a source, for comparing an identification of the source and the second cookie with the stored identification and the stored cookie to determine whether the second cookie contains the same information as the first cookie and whether the second cookie was received from the particular data processing system; and allowing means, responsive to a match between the identification of the source and the second cookie and the stored identification and the stored cookie, for allowing access to the resource.

15. The data processing system of claim 14, wherein access to the resource is allowed by accepting the second cookie.

16. The data processing system of claim 14 further comprising:

rejecting means, responsive to an absence of a match between the identification of the source and the second cookie and the stored identification and the stored cookie, for rejecting the second cookie.

17. The data processing system of claim 14, wherein the resource is a file and the first cookie identifies disk location of the file.

18. The data processing system of claim 14, wherein the source is a web server.

19. The data processing system of claim 14, wherein the storing means for storing an identification of the source and the first cookie to form a stored identification and a stored cookie comprises:

storing means for storing the identification of the source and the first cookie in a cache.

20. The data processing system of claim 19, wherein the identification is an Internet protocol address.

21. The data processing system of claim 14, wherein the receiving means, sending means, storing means, comparing means, and allowing means are performed in a browser.

22. The data processing system of claim 14, wherein the resource is a file having a path and further comprising:

generating means for generating a disk location number from the path; and placing means for placing the disk location number into the first cookie.

23. A computer program product in a computer readable medium for providing access to resources within the data processing system, the computer program product comprising:

first instructions for receiving a request from a requestor to access a resource in the data processing system;

second instructions for sending a first cookie to the requester, wherein the first cookie is used to access the resource;

third instructions for storing an identification of the requestor and the first cookie to form a stored identification and a stored cookie, wherein the identification of the requestor identifies a particular data processing system from which the request originated;

fourth instructions, responsive to receiving a second cookie from a source, for comparing an identification of the source and the second cookie with the stored identification and the stored cookie to determine whether the second cookie contains the same information as the first cookie and whether the second cookie was received from the particular data processing system; and fifth instructions, responsive to a match between the identification of the source and the second cookie and the stored identification and the stored cookie, for allowing access to the resource.

* * * * *